United States Patent [19]

Ellozy et al.

[11] Patent Number: 5,005,205

[45] Date of Patent: Apr. 2, 1991

[54] HANDWRITING RECOGNITION EMPLOYING PAIRWISE DISCRIMINANT MEASURES

[75] Inventors: Hamed A. Ellozy, Bedford Hills; Henry H. Jeanty, Patterson; Charles C. Tappert, Ossining, all of N.Y.

[73] Assignee: International Business Machines Corporation, Armonk, N.Y.

[21] Appl. No.: 463,770

[22] Filed: Jan. 12, 1990

[51] Int. Cl.$^5$ .............................................. G06K 9/00
[52] U.S. Cl. ...................................................... 382/3
[58] Field of Search ................................. 382/3, 13, 34

[56] References Cited

U.S. PATENT DOCUMENTS 4,901,358  2/1990  Bechet .................................. 382/3

Primary Examiner—Stephen Brinich
Attorney, Agent, or Firm—Perman & Green

[57] ABSTRACT

In a handwriting recognition system a method for differentiating a first character from a second character having similar characteristics. The method includes the steps of determining during a training session at least one pairwise discriminant measure associated with the first character and with the second character. The step of determining includes a step of evaluating with a potential discriminant measure a plurality of prototype first characters and a plurality of prototype second characters. Subsequently, during a handwriting recognition session, the method evaluates with at least one of the previously determined discriminant measures selected from a set of same an input character identified as being either the first prototype character or the second prototype character. The step of evaluating includes a step of analyzing a stroke or strokes associated with the input character in accordance with one or more of the pairwise discriminant measures selected from the set, summing the results of each discriminant measure analysis to obtain a result for each of the pair of characters associated with the pairwise discriminate measure, and selecting a character from the pair that has a maximum value result.

18 Claims, 2 Drawing Sheets

HANDWRITING RECOGNITION EMPLOYING PAIRWISE DISCRIMINANT MEASURES

FIELD OF THE INVENTION

This invention relates generally to handwriting recognition systems and, in particular, to a handwriting recognition system that employs pairwise discriminant measures.

BACKGROUND OF THE INVENTION

Pairwise discrimination is known as a technique for recognizing handwritten characters. In general, this approach employs one or more special procedures to separate a pair of characters that might be readily confused. Pairwise discrimination algorithms have evolved generally from perceptual studies. For example, studies of the methods employed by human subjects to distinguish between character pairs has resulted in a theory of character discrimination based upon functional attributes. Examples of such studies are reported in the following journal articles: Y. Watanabe, J. Gyoba, T. Hirata, and K. Maruyama, "A Psychological Approach to the Human Recognition of Ambiguous Characters", J. Inst. TV Engrs. of Japan, Vol. 39, pp. 509–515, 1985; and Y. Watanabe, J. Gyoba, and K. Mauryama, "Reaction Time and Eye Movements in the Recognition Task of Hand-written Kataklna-Letters: An Experimental Verification of the Discriminant Analysis of Letter Recognition by Hayashi's Quantification", Japanese J. Psychology, Vol. 54, pp. 58–51 1983. Some pair distinction methods related to handwritten characters have been described by T. Sakai, K. Odaka. and T. Toida, "Several Approaches to Development of On-Line Handwritten Character Input Equipment", Proc. 7th Int. Conf. Pattern Recognition, pp. 1052–1054, 1984 and by C. Y. Suen and R. J. Shillman, "Low Error Rate Optical Character Recognition of Unconstrained Handprinted Letters Based on a Model of Human Perception", IEEE Trans. Systems, Man, and Cybernetics, Vol. 7, pp. 491–495, June 1977. In this latter journal article a linear discriminant is reported to be employed for differentiating between the U-V character pair and weighting coefficients are determined according to the relative importance of features determined during a learning stage. B. A. Blesser, T. T. Kuklinski and R. J. Shillman describe in a journal article entitled "Empirical Tests for Feature Selection Based On A Psychological Theory of Character Recognition", Pattern Recognition, Vol. 8, pp. 77–85, 1976 a theory of characters based on notions of physical attributes, perceptual attributes and functional attributes. A "goodness rating" was obtained from human subjects viewing a stimulus character and, for each stimulus, two mean goodness ratings were obtained by averaging across subjects (pp. 80–81).

In a journal article entitled "Automatic Recognition of Isolated Arabic Characters", Signal Processing, Vol. 14, 2 March 1988, T. El-Sheikh et al. describe a technique for pairwise discrimination that relies on a linear discriminant function. However, it is known that there are cases in which a linear discriminant function cannot separate two classes of characters. This is particularly true of cases in which the two classes are composed of similar characters. Another problem associated with the use of such a linear discriminant function is that both characters of the pair must have the same representation. This is reported to be achieved by the use of the first n coefficients of a Fourier series representation of the contour of a shape.

In an article "Cluster Analysis of English Text", IEEE, 1978, G. Toussaint et al. discuss the distribution of characters, pairs of characters and so on. The term pair-wise is employed to describe the difference between pairs of ten types of text.

In U.S. Pat. No. 3,868,635, issued Feb. 25, 1975, Shah et al. describe a system that uses dedicated hardware to recognize characters and discuss a method to count the presence and absence of character features. For example, when given an unknown character which could be either "U" or "V" the system of Shah et al. counts the number of features of the unknown character which belong to the class "U" and those features that belong to class "V". Based on these counts a decision is made. However, as stated at Col. 3, lines 11–14 Shah et al. offer no suggestion as to the type of feature that would be used. As such, it appears that their disclosure is directed not towards handwritten character recognition systems but instead towards optical character recognition systems in which fonts are generally well defined.

In a journal article entitled "On a Method of Selection of Representative Patterns Using Binary Distance Matrix" IEEE Transactions on Systems, Man, and Cybernetics, Vol. FMC-10, No. 8, August 1980, A. Som et al. propose a noniterative method of selecting representative patterns. This approach is based solely on the Euclidean distance between samples. However, the concept of Euclidean distance between certain pairs of characters can be shown to have little or no meaning. For example, a stroke by stroke comparison of the character pair "T" and "+", when written with two strokes, shows no difference. The difference between the two characters is not obtained with a Euclidean distance function but instead with a topological relationship of the two strokes. That is, for this character pair a feature "Height of Horizontal Stroke above Baseline" discriminates between the two characters.

In U.S. Pat. No. 3,111,646, issued Nov. 19, 1963, L. Harmon describes method and apparatus for measuring cursive script. Harmon apparently assumes that a comparator always arrives at a clear decision as to the identity of a written character. However, as is well known this is often not the case.

It is thus an object of the invention to provide a handwritten character recognition system that automatically selects one or more pairwise discriminant measures from a predetermined inventory of discriminants.

It is another object of the invention to provide a handwritten character recognition system that considers psychologically significant character features such as the degree of closure in a pattern or the straightness of a stroke when developing a predetermined inventory of discriminants.

It is another object of the invention to provide a handwritten character recognition system that employs pairwise discrimination measures and that determines a goodness value associated with a proposed discriminant measure as the difference of means divided by the average of standard deviations as determined from a set of training characters.

It is further object of the invention to provide an improved handwritten character recognition system that employs pairwise discrimination measures and that uses a weighted output of feature selectors in making a final decision as to an identity of a character.

SUMMARY OF THE INVENTION

The foregoing problems are overcome and the objects of the invention are realized by a method for differentiating a first character from a second character having similar characteristics. The method includes the steps of (a) selecting one or more discriminants that satisfy a predetermined threshold relating to a number of occurrences (N) of original characters in a training set and also to a predetermined threshold relating to a percent accuracy (P) in correctly differentiating between training characters; (b) assigning a weight to each selected discriminant, the weight being equal to a product (P*G) of a goodness value (G) associated with the discriminant and (P); and (c) summing the weights to discriminate between the first and the second characters.

During a training session at least one discriminant measure associated with the first character and with the second character is determined by a step of evaluating with a potential discriminant measure a plurality of prototype first characters and a plurality of prototype second characters. Subsequently during a handwriting recognition session the method analyses with at least one of the previously determined discriminant measures an input character identified as being either the first prototype character or the second prototype character.

The step of evaluating includes a step of calculating the goodness value associated with the first prototype character and the second prototype character. The goodness value is defined as a difference between a mean of the first prototype character (char1) and a mean of the second prototype character (char2) divided by an average of a standard deviation of the first prototype character and a standard deviation of the second prototype character in accordance with the expression $$GOODNESS = \frac{MEAN(char1) - MEAN(char2)}{((ST\_DEVIATION(char1) + ST\_DEVIATION(char2))/2)}.$$

The step of evaluating further includes a step of selecting for inclusion within a set of discriminate measures a potential discriminate measure when a plurality of conditions are found to be satisfied. The plurality of conditions include conditions wherein (a) a training set of prototype characters is found to contain at least (N) occurrences of each of the plurality of first prototype characters and the plurality of second prototype characters, and (b) the potential discriminate measure correctly discriminates between at least (P) percent of the prototype first characters and prototype second characters of the training set.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF A PREFERRED EMBODIMENT OF THE INVENTION

Figure 1:
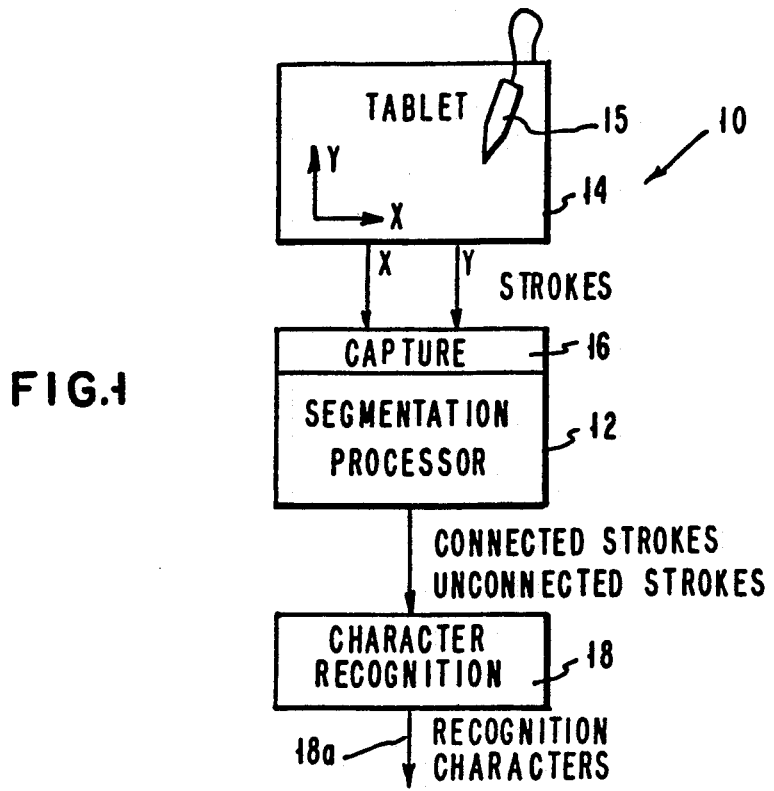
FIG. 1 is a block diagram of a handwritten character recognition system suitable for practicing the invention.

Referring to FIG. 1 there is shown in block diagram form a character recognition system 10 that includes a segmentation processor 12 coupled between an electronic tablet 14 and a character recognizer 18. Tablet 14 can be any of a number of suitable commercially available electronic tablets. The tablet 14 has an associated stylus or pen 15 with which, in a pen-down position, a user forms symbols, such as block printing or script alphanumeric characters, on a surface of the tablet 14. The tablet 14 has x-axis and y-axis output signals expressive of the position of the pen 15 on an x-y tablet coordinate system. A stroke capture means 16 may be a software task which intercepts the x-y outputs from the tablet to generate x-y position pair data for the segmentation processor 12. An output of the segmentation processor 12 is data expressive of connected strokes and unconnected strokes which is input to the character recognizer 18 of the invention. The character recognizer 18 operates to determine an identity of a connected group of strokes and has an output 18a expressive of identified symbols such as alphanumeric characters.

In this regard it should be realized that the invention is applicable to the recognition of a number of hand-drawn symbols wherein a given symbol is composed of at least one stroke. As such, the system 10 may recognize symbols associated with written characters of various languages and also mathematical and other types of symbols. Although the use of the invention is intended for on-line, real-time recognition of handwritten symbols its use is not limited to only such real-time systems.

As described in detail below the character recognizer 18 of the invention employs pairwise discrimination measures and considers character feature selectors known to have psychological meaning. The character recognizer 18 further uses a weighted output of character feature selectors in making a final decision as to an identity of a handwritten character.

Table 1 lists character pairs that tend to be confused in the written English language. The confusion between characters of the pair involves the degree of closure, line extension, or other features. However, one or more features generally discriminates between the characters of the pair. For example, in English the D-P discriminant is one of line extension while the C-O discriminant is one of closure. The column "# STR" indicates a number of strokes with which the character is formed.

TABLE 1

Pairwise Distinction for Common Confusions

| PAIR | # STR | DISCRIMINANT |
|---|---|---|
| Upper Case: | | |
| A-H | 3 | closure |
| C-L | 1 | other feature (corner vs curved) |
| C-O | 1 | closure |
| D-P | 1,2 | line extension |
| F-1 | 3 | other feature (relative height of low horizontal stroke) |
| J-T | 2 | other feature (straightness vs curved) |
| N-W | 2 | other feature (overwrite vs gap - like closure) |
| O-U,V | 1 | closure |
| U-V | 1 | other feature (corner vs curved) |
| V-Y | 2 | line extension |
| X-Y | 2 | line extension |
| Lower Case: | | |

TABLE 1-continued

Pairwise Distinction for Common Confusions

| PAIR | # STR | DISCRIMINANT |
|---|---|---|
| a-u | 1 | closure |
| a-d | 1,2 | line extension |
| b-h | 1,2 | closure |
| c-e | 1 | closure, other feature (corner) |
| c-o | 1 | see C-O |
| g-y | 1,2 | closure |
| h-n | 1,2 | line extension |
| o-u,v | 1 | see O-U,V |
| r-v | 1 | other feature |
| u-v | 1 | see U-V |
| x-y | 2 | see X-Y |
| Upper/Lower Case: | | |
| K-k | 2,3 | line extension |
| P-p | 1,2 | line extension (relative to baseline) |
| Numbers and Letter/Number: | | |
| 0,O-6 | 1 | line extension, other feature |
| 4-9 | 1,2 | combination of closure, line extension other feature |
| G-6 | 1 | other feature |
| S,s-5 | 1 | other feature (corner vs curved) |
| Z,z-2 | 1 | other feature (corner vs curved) |
| a-9 | 1 | line extension |
| b-6 | 1 | other feature |
| q-9 | 1 | line extension (relative to baseline) |
| z-3 | 1 | line extension (relative to baseline) |

In accordance with such discriminant information obtained from perceptual studies the invention provides discriminant measures operable for separating and differentiating the character pairs of Table 1. These discriminant measures are set forth in Tables 2, 3 and 4 for line extension, closure, and other features, respectively, and these Tables further list those confusable character pairs for which a particular measure may apply. The discriminant measures are also typically of a general nature and tend beneficially to discriminate several character pairs and to also have useful complementary discriminants. However, although the discriminants set forth in Tables 2, 3 and 4 are useful for many applications they may not be optimal for all applications and may not apply to all writers. Thus, the teaching of the invention is not intended to be limited to only those discriminant measures listed below but is to be given a broader scope in accordance with an example of a discriminant measure derivation that follows.

In the Tables L(*) is a sum of lengths of line segments (*), cg(*) is a center-of-gravity(*), H(*) is ymax(*)−ymin(*), Width is xmax(*)−xmin(*), and dist. is an abbreviation for distance.

TABLE 2

Pairwise Distinction-Line Extension

| PAIR | # STR | DISCRIMINANT MEASURE | DESCRIPTION |
|---|---|---|---|
| D-P | 1,2 | $\frac{y(\text{last pt}) - y\text{min}(\text{char})}{H(\text{char})}$ | Relative height of last point of char |
| F-1 | 3 | | |
| X-Y | 2 | | |
| 0,O-6 | 1 | | |
| a-d | 1 | $\frac{y(\text{1st pt}) - y\text{min}(\text{char})}{H(\text{char})}$ | Relative height of first point of char |
| D-P | 2 | $\frac{y\text{min}(\text{str 1}) - y\text{min}(\text{str 2})}{H(\text{char})}$ | Relative difference of ymin's of 2-stroke char |
| V-Y | 2 | | |
| X-Y | 2 | | |
| a-d | 2 | $\frac{y\text{max}(\text{str 1}) - y\text{max}(\text{str 2})}{H(\text{char})}$ | Relative difference of ymax's of 2-stroke char |
| h-n | 2 | | |
| K-k | 2 | | |

TABLE 2-continued

Pairwise Distinction-Line Extension

| PAIR | # STR | DISCRIMINANT MEASURE | DESCRIPTION |
|---|---|---|---|
| P-p | 1,2 | $\frac{\text{baseline} - y\text{min}(\text{char})}{H(\text{char})}$ | Relative extension below baseline |
| q-9 | 1 | | |
| z-3 | 1 | | |

TABLE 3

Pairwise Distinction-Closure

| PAIR | # STR | DISCRIMINANT MEASURE | DESCRIPTION |
|---|---|---|---|
| b-h | 1,2 | $\frac{x(\text{last pt}) - x\text{min}(\text{char})}{W(\text{char})}$ | Relative width of last point of char |
| g-q | 1,2 | | |
| G-6 | 1 | | |
| a-u | 1 | $\frac{x(\text{1st pt}) - x\text{min}(\text{char})}{W(\text{char})}$ | Relative width of first point of char |
| c-e | 1 | | |
| g-y | 1 | | |
| C-L | 1 | | |
| C-O | 1 | $\frac{y(\text{1st pt}) - y(\text{last pt})}{H(\text{char})}$ | Relative y difference of 1st and last pts of char |
| O-U,V | 1 | $\frac{x(\text{last pt}) - x(\text{1st pt})}{W(\text{char})}$ | Relative x difference of 1st and last pts of char |

TABLE 4

Pairwise Distinction-Other Features

| PAIR | # STR | DISCRIMINANT MEASURE | DESCRIPTION |
|---|---|---|---|
| h-n | 1 | $\frac{cgy(\text{char}) - y\text{min}(\text{char})}{H(\text{char})}$ | Relative height of cgy of char |
| 0-6 | 1 | | |
| a-9 | 1 | | |
| J-T | 2 | | |
| r-v | 1 | $\frac{cgx(\text{char}) - x\text{min}(\text{char})}{W(\text{char})}$ | Relative width of cgx of char |
| J-T | 2 | | |
| J-T | 2 | $\frac{\text{dist between endpoints}}{L(\text{stroke})}$ | Straightness of stroke (1-line fit to stroke) (4 strokes) |
| 1-( | 1 | | |
| U-V | 1 | $\frac{\text{sum dist bet endpts of fit}}{L(\text{stroke})}$ | Straightness of 2-line fit to stroke (2 strokes) |
| C-L | 1 | | |
| Z-2 | 1 | $\frac{\text{sum dist bet endpts of fit}}{L(\text{stroke})}$ | Straightness of 3-line fit to stroke (2 strokes) |
| U-V | 1 | $\frac{H(\text{char})}{W(\text{char})}$ | Ratio of H to W of char |

As an illustration of a method of determining the above set forth discriminant measures there is described in detail the first discriminant measure of Table 2. A proposed discriminant measure of the confusable character pair D-P that optimally measures the line extension may be expressed in a precise form as:

DISCRIMINANT =

$$\frac{y(\text{min of curved part of char}) - y\text{min}(\text{char})}{H(\text{char})}.$$

Figure 2:
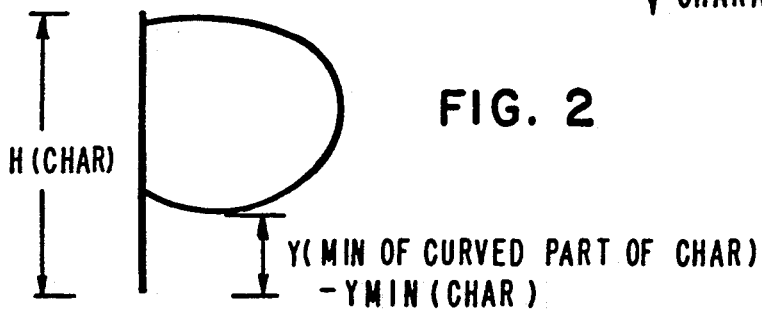
FIG. 2 shows by example discrimination components of the character pair D-P.
Figure 3A:
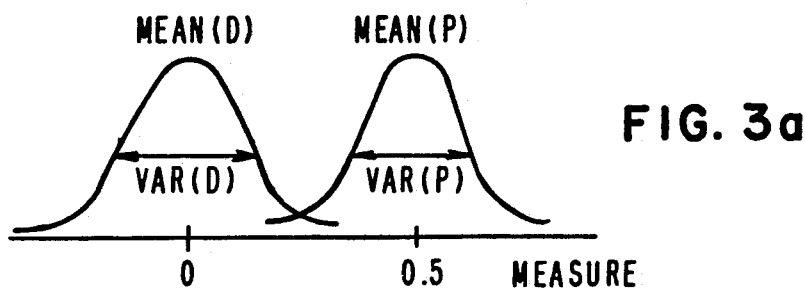
FIGS. 3a and 3b show representative probability distributions for the D-P discrimination.
Figure 3B:
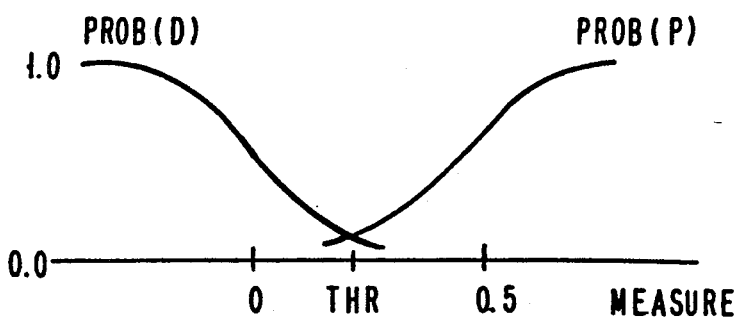

FIG. 2 illustrates this discriminant measure applied to the character pair D-P while FIGS. 3a and 3b show the probability distribution for the D-P discrimination. For simplicity Table 2 recites "y(last pt)", that is the y coordinate of the last point, in place of y(min of curved part of char), i.e., $$\text{DISCRIMINANT} = \frac{y(\text{last pt}) - y\text{min}(\text{char})}{H(\text{char})}.$$

In accordance with an aspect of the invention the proposed discriminant measure is determined in accordance with a characteristic found to be typically considered by human subjects, specifically "the relative height of the last point of the character". This general discriminant discriminates the following character pairs: 1-stroke D-P, 2-stroke D-P when the curved stroke is last, F-I when the lower horizontal stroke is last, and 2-stroke X-Y when the shorter stroke of Y is last. It also has useful complementary discriminants, "the relative height of the first point of the character" from Table 2 and the character pairs dealing with relative width from Table 3.

In accordance with a further aspect of the invention discriminant functions associated with confusable character pairs may be chosen, if desired, automatically by specifying a proposed function and analysing a number of different character pairs with the proposed function. In this regard automatic selection has been found to ensure alphabet independence. Furthermore, specifying a specific discriminant measure a priori may result in the creation of a problem in that substantial variation of character formation can occur within an alphabet. However, the automatic determination of discriminant measures requires substantial training of the system 10. To reduce training time, a user may be requested to enter additional prototypes, or samples, of confusable characters. Alternatively, potential candidate discriminant measures for typically confused character pairs may be specified.

One alternative to choosing discriminants automatically is to choose the discriminants manually at least for alphabets like uppercase, lowercase and digits. In this regard those discriminants found optimal during perceptual studies can be selected.

In choosing discriminant measures and for each prototype, the nearest prototypes of other classes are determined. For close character pairs, within a predetermined threshold of one another, one or more discriminant measures are determined in accordance with the invention as follows. For each of two prototypes, where each prototype is an average of at least N original characters, the mean and a standard deviation of each discriminant are determined. Next, a "goodness" value of each discriminant measure is determined, where goodness is defined as a difference between the mean of the first character (char1) and the mean of the second character (char2) divided by an average of a standard deviation (ST_DEVIATION) of the first character and a standard deviation of the second character in accordance with the expression:

$$\text{GOODNESS} = \frac{\text{MEAN}(\text{char1}) - \text{MEAN}(\text{char2})}{((\text{ST\_DEVIATION}(\text{char1}) + \text{ST\_DEVIATION}(\text{char2}))/2)}$$

Proposed discriminant measures are chosen for inclusion within the set of discriminant measures based upon their goodness values and on their ability to discriminate between training prototype characters. For a proposed discriminant measure to be selected and associated with the character pair each of the two characters of the pair must have at least (N) tokens in the training set and the discriminant measure must separate or differentiate between at least (P) percent of the training characters. The threshold for the discriminant decision is set (a) midway between the gap for disjoint probability distributions or is set (b) to yield optimal recognition on training data for overlapping probability distributions.

The automatic selection of discriminant measures during handwriting recognition requires an inventory of operable discriminant functions; that is, a set of discriminant functions that measure appropriate differences between characters. Choosing discriminants automatically also requires careful selection of only good discriminants based on criteria such as a cutoff threshold of the percentage of prototype character pairs separated by the proposed discriminant measure. This also implies that sufficient prototype data is provided. By example, at least 12 tokens of each of the pair of confusable characters has been found to provide adequate results for establishing discriminant measures.

Typically during a character recognition session a technique such as elastic matching is first employed in an attempt to recognize a handwritten character. If the elastic matching technique returns a value indicative of a match with a prototype then further discriminant measure techniques are not required. However, if the elastic matching technique returns an ambiguous result the discriminant measure method of the invention is employed to resolve the ambiguity. Of course, the value(s) returned from the elastic matching technique can be considered as additional weighting factors when making a final determination as to an identity of the character. By example, a technique closely related to elastic matching is disclosed in U.S. Pat. No. 4,317,109, Feb. 23, 1982, to K. Odaka et al. and entitled "Pattern Recognition System for Hand-written Characters Operating on an On-Line Real-Time Basis".

Figure 4:
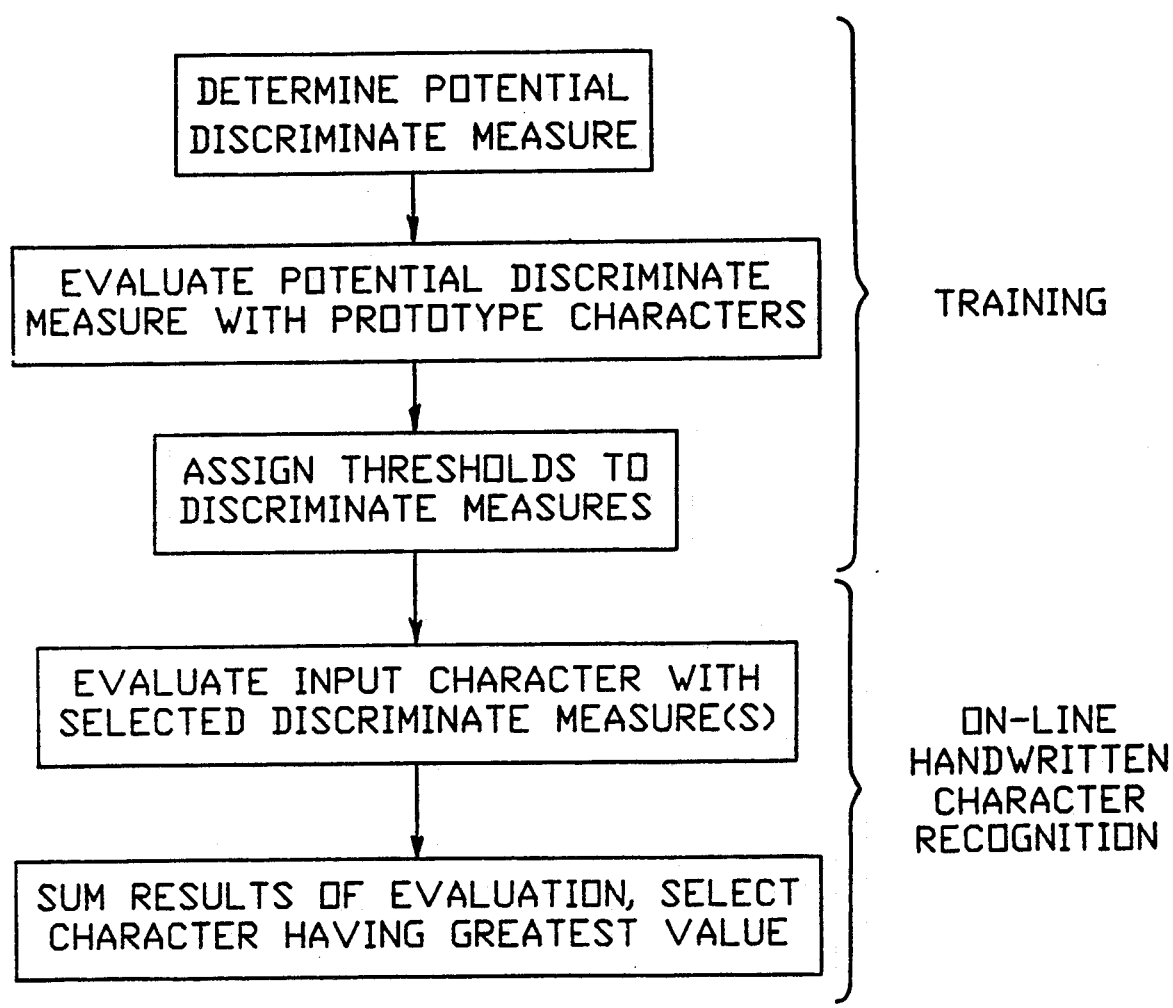
FIG. 4 is a flowchart illustrating the operation of a method of the invention.

The discriminant measures are used as follows and as illustrated in the flowchart of FIG. 4. A confusion is said to exist between a pair of characters when there is a second character choice remaining after a character identification technique such as elastic matching. A second character choice is considered to remain if a value associated with a second character is close, that is within some threshold, of a first character. In accordance with the invention, all discriminants satisfying the thresholds (N) and (P) are assigned a weight equal to the product of its goodness value and accuracy on training data (P*G), and the weights are summed to make the final discrimination.

By example, Table 5 illustrates an example of a discrimination between the characters "Z" and "2". An elastic matching technique choose the character "Z", but pairwise discrimination chose the correct character "2". The tentatively identified characters Z-2 are used to index into a table comprised of the predetermined discriminate functions to select the appropriate discriminate function(s). In the table each discriminate function has associated therewith one or more applicable character pairs, in a manner similiar to that illustrated in Tables 2-4. For the Z-2 determination three discriminants satisfying the thresholds N=12 and P=95 are identified and selected. An analysis of the stroke coordinates by the selected functions yields the character "2".

TABLE 5

| CHOICE | DISCRIMINANTS for Z-2 | P | G | P*G |
|---|---|---|---|---|
| Z | Difference in elastic match scores | 97.8 | 3.91 | 382.3 |
| 2 | Straightness of 3-line fit | 100.0 | 3.88 | 387.9 |
| 2 | Ratio of height/width | 95.6 | 2.87 | 273.9 |

As a further example of the use of the invention reference is made to the flow chart of FIG. 4. First, a potential discriminant function is determined. By example, a potential discriminant function is determined for differentiating between the character pair U-O based on closure. In this example, the discriminant function may be based on the observation that the first and the last point of a single stroke should be relatively close together in the case of a "O" and further apart in the case of "U". A number of prototype characters, preferably at least equal to (N), are subsequently evaluated by the potential discriminant function and the goodness value for the proposed discriminant function for confusable pairs of the characters is determined as set forth above. If the percent correct on training exceeds the predetermined threshold (P), such as 95 percent, the discriminant function is placed in a library of discriminant functions associated with the character pair. During this determination some discriminants, such as the straightness of the stroke, will be found to have a percent correct on training that falls below the predetermined threshold. As a result the potential discriminant function that falls below the threshold (P) is not associated with those character pairs.

EXAMPLE

With N=12 and P=95, the following results were obtained on a set of handwritten data including upper and lower case characters, digits, and special symbols.

| Subj/Day | Errors w/o Discriminants | Percent | Errors with Discriminants | Percent |
|---|---|---|---|---|
| 12 | 92 | 7.9 | 89 | 7.7 |
| 22 | 120 | 10.4 | 115 | 9.9 |
| 32 | 177 | 15.0 | 176 | 14.9 |
| 42 | 230 | 19.7 | 218 | 18.6 |
| Total | 619 | | 598 | |

It can be seen that using the pairwise discriminant measure method of the invention identification errors decreased by 3.4 percent (21/619). In that only 10 percent of the original error was due to the recognizer, pairwise discrimination reduces the error due to the recognizer by approximately one third. Most of the remaining error was due to ambiguously written characters that could not be recognized by humans.

The pairwise discrimination method of the invention is both fast and accurate. It is fast because the bulk of the computation is done during training. That is, the choosing of discriminants, the computation of the respective goodness values and the determination of percent correct and threshold values are all accomplished during training and not during the recognition process itself. Although a presently preferred embodiment of the invention provides for individual writers to each enter training characters for generating writer-specific discriminant functions it is also within the scope of the invention to provide a general set of discriminant functions useable with a number of different writers.

The teaching of the invention is not restricted to a single type of character representation as are some conventional approaches. The method of the invention also overcomes problems associated with the above mentioned linear discriminant function. The teaching of the invention is also useful for discriminating between characters which do not have a real contour, such as "X", and between characters that are written with many strokes.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. In a handwriting recognition system, a method for discriminating a first handwritten character from a second handwritten character, comprising the steps of:

selecting one or more discriminants that satisfy a predetermined threshold relating to a number of occurrences (N) of original characters in a training set and to a predetermined threshold relating to a percent accuracy (P) in correctly differentiating between training characters;

assigning a weight to each selected discriminant, the weight being equal to a product (P*G) of a goodness value (G) associated with the discriminant and (P); and summing the weights to discriminate between the first and the second characters.

2. A method as set forth in 1 wherein G is defined as a difference between a mean of a first prototype character (char1) and a mean of a second prototype character (char2) divided by an average of a standard deviation of the first prototype character and a standard deviation of the second prototype character in accordance with the expression:

$$\text{GOODNESS} = \frac{\text{MEAN (char1)} - \text{MEAN(char2)}}{((\text{ST\_DEVIATION(char1)} + \text{ST\_DEVIATION(char2)})/2)}.$$

3. A method as set forth in claim 2 wherein a threshold for discriminant decision is determined to be (a) approximately midway within a gap between disjoint probability distributions of the first prototype character and the second prototype character or (b), is determined to yield an optimal recognition of the correct character for overlapping probability distributions of the first prototype character and the second prototype character.

4. A method as set forth in claim 1 wherein (N) is at least approximately 12 and wherein P is approximately 95 percent.

5. In a handwriting recognition system, a method for differentiating a first character from a second character, comprising the steps of:

determining during a training session at least one discriminant measure associated with the first character and with the second character, the step of determining including a step of evaluating with a potential discriminant measure a plurality of prototype first characters and a plurality of prototype second characters; and during a handwriting recognition session evaluating with at least one of the previously determined discriminant measures an input character identified as being either the first prototype character or the second prototype character;

wherein the step of determining includes a step of calculating a goodness value associated with the first prototype character and the second prototype character, wherein the goodness value is defined as a difference between a mean of the first prototype character (char1) and a mean of the second prototype character (char2) divided by an average of a standard deviation of the first prototype character and a standard deviation of the second prototype character in accordance with the expression $$\text{GOODNESS} = \frac{\text{MEAN(char1)} - \text{MEAN(char2)}}{(\text{ST\_DEVIATION(char1)} + \text{ST\_DEVIATION(char2)})/2}.$$

6. A method as set forth in claim 5 wherein the step of determining further includes a step of selecting a potential discriminate measure when a plurality of conditions are found to be satisfied, the plurality of conditions including (a) a training set of prototype characters is found to contain at least (N) occurrences of each of the plurality of first prototype characters and the plurality of second prototype characters, and (b) the potential discriminate measure correctly discriminates between at least (P) percent of the prototype first characters and prototype second characters of the training set.

7. A method as set forth in claim 6 wherein a threshold for discriminant decision is determined to be approximately midway within a gap between disjoint probability distributions of the first prototype character and the second prototype character.

8. A method as set forth in claim 6 wherein a threshold for discriminant decision is determined to yield an optimal recognition of the correct character for overlapping probability distributions of the first prototype character and the second prototype character.

9. A method as set forth in claim 6 wherein (N) is at least approximately 12.

10. A method as set forth in claim 5 wherein the step of evaluating includes the steps of:

analyzing a stroke or strokes associated with the input character in accordance with one or more previously determined discriminant measures;

summing the results of each discriminant measure analysis to obtain a result for each character; and selecting a character having a maximum result value.

11. A method of determining with a handwriting recognition system an identity of a handwritten character tentatively identified to be either a first character or a second character, the method including the steps of inputting a handwritten stroke or strokes expressive of a character; and analyzing the strokes in accordance with one or more pairwise discriminant measures selected from a set of pairwise discriminant measures, the selected pairwise discriminant measure or measures having been previously determined to accurately discriminate at least (P) percent of the time between the first character and the second character based on a plurality of at least N prototype first characters and on a plurality of at least N prototype second characters.

12. A method as set forth in claim 11 wherein each pairwise discriminant measure is selected from a set of pairwise discriminant measures comprised of:

| PAIR | # STR | DISCRIMINANT MEASURE |
|---|---|---|
| D-P | 1,2 | $\dfrac{y(\text{last pt}) - y\min(\text{char})}{H(\text{char})}$ |
| F-l | 3 | |
| X-Y | 2 | |
| O,0-6 | 1 | |
| a-d | 1 | $\dfrac{y(\text{1st pt}) - y\min(\text{char})}{H(\text{char})}$ |
| D-P | 2 | $\dfrac{y\min(\text{str 1}) - y\min(\text{str 2})}{H(\text{char})}$ |
| V-Y | 2 | |
| X-Y | 2 | |
| a-d | 2 | $\dfrac{y\max(\text{str 1}) - y\max(\text{str 2})}{H(\text{char})}$ |
| h-n | 2 | |
| K-k | 2 | |
| P-p | 1,2 | $\dfrac{\text{baseline} - y\min(\text{char})}{H(\text{char})}$ |
| q-9 | 1 | |
| z-3 | 1 | |
| b-h | 1,2 | $\dfrac{x(\text{last pt}) - x\min(\text{char})}{W(\text{char})}$ |
| g-q | 1,2 | |
| G-6 | 1 | |
| a-u | 1 | $\dfrac{x(\text{1st pt}) - x\min(\text{char})}{W(\text{char})}$ |
| c-e | 1 | |
| g-y | 1 | |
| C-L | 1 | |
| C-O | 1 | $\dfrac{y(\text{1st pt}) - y(\text{last pt})}{H(\text{char})}$ |
| O-U,V | 1 | $\dfrac{x(\text{last pt}) - x(\text{1st pt})}{W(\text{char})}$ |
| h-n | 1 | $\dfrac{cgy(\text{char}) - y\min(\text{char})}{H(\text{char})}$ |
| 0-6 | 1 | |
| a-9 | 1 | |
| J-T | 2 | |
| r-v | 1 | $\dfrac{cgx(\text{char}) - x\min(\text{char})}{W(\text{char})}$ |
| J-T | 2 | |
| J-T | 2 | $\dfrac{\text{dist. between endpoints}}{L(\text{stroke})}$ |
| l-( | 1 | |
| U-V | 1 | $\dfrac{\text{sum dist bet endpts of fit}}{L(\text{stroke})}$ |
| C-L | 1 | |
| Z-2 | 1 | $\dfrac{\text{sum dist bet endpts of fit}}{L(\text{stroke})}$ |
| U-V | 1 | $\dfrac{H(\text{char})}{W(\text{char})}$, | wherein for a plurality of character pairs (PAIR) each character is formed by a number of strokes (#STR), each stroke being defined by x and y coordinates, and wherein Length L(*) is a sum of lengths of line segments (*), cg(*) is a center-of-gravity(*), H(*) is ymax(*)−ymin(*) and Width is xmax(*)−xmin(*).

13. A method as set forth in claim 11 and including an initial step of determining during a training session one or more pairwise discriminants associated with the character pair, the step of determining including a step of evaluating with a potential pairwise discriminant measure a plurality of the prototype first characters and a plurality of the prototype second characters, wherein the step of determining includes a step of calculating a goodness value associated with the first prototype character and with the second prototype character, and wherein the goodness value is defined as a difference between a mean of the first prototype character (char1) and a mean of the second prototype character (char2) divided by an average of a standard deviation of the first prototype character and a standard deviation of the second prototype character in accordance with the expression $$\text{GOODNESS} = \frac{\text{MEAN (char1)} - \text{MEAN(char2)}}{((\text{ST\_DEVIATION(char1)} + \text{ST\_DEVIATION(char2)})/2)}.$$

14. A method as set forth in claim 11 wherein (N) is at least approximately 12 and wherein P is approximately 95 percent.

15. A method as set forth in claim 13 wherein the step of analyzing includes the steps of:

assigning a weight to each selected discriminant measure, the weight being equal to a product (P*G) of the goodness value (G) associated with the discriminant measure and (P); and summing the weights to discriminate between the first character and the second characters.

16. A method as set forth in claim 11 wherein the step of analyzing includes an initial step of selecting pairwise discriminate that discriminates between the first character and the second character based upon a character stroke feature selected from the group consisting of linear extension, closure, other feature and combinations thereof.

17. A method as set forth in claim 11 wherein the step of analyzing includes an initial step of selecting a pairwise discriminate that discriminates between the first character and the second character based upon a character feature known to be considered by human subjects when visually discriminating between the first character and the second character.

18. A method as set forth in claim 11 wherein the one or more pairwise discriminant measures are selected based upon a tentative identification of the input character.

* * * * *

UNITED STATES PATENT AND TRADEMARK OFFICE
CERTIFICATE OF CORRECTION

PATENT NO. : 5,005,205

DATED : April 2, 1991

INVENTOR(S) : Ellozy et al.

It is certified that error appears in the above-identified patent and that said Letters Patent is hereby corrected as shown below:

Claim 11, col. 11, line 67, delete the phrase "of at least N prototype" and replace with --($\geq$N) prototype--.

Claim 11, col. 11, line 68, delete the phrase "of at least N prototype" and replace with --($\geq$N) prototype--.

Claim 12, col. 12, line 7, delete the upper case "Y" and replace with a lower case --y--.

Signed and Sealed this

Eleventh Day of August, 1992

Attest:

DOUGLAS B. COMER

*Attesting Officer*     *Acting Commissioner of Patents and Trademarks*